March 10, 1959

R. WIENER 2,877,389

PRINTED ELECTRONIC CIRCUIT

Filed June 25, 1953

INVENTOR.
ROBERT WIENER
BY John W. Michael
ATTORNEY

United States Patent Office 2,877,389

Patented Mar. 10, 1959

2,877,389

PRINTED ELECTRONIC CIRCUIT

Robert Wiener, Milwaukee, Wis., assignor to Globe-Union Inc., Milwaukee, Wis., a corporation of Delaware Application June 25, 1953, Serial No. 364,025

4 Claims. (Cl. 317—101)

This invention relates to improvements in printed electronic circuit units and particularly to units embodying complex resistance capacitance (R. C.) filter networks.

Heretofore units of this type have been limited to simple circuits such as pi type filters in which the resistance has been connected to electrodes mounted on the same side of the dielectric base plate.

It is the object of this invention therefore to provide units of this type consisting of complex R. C. filters in which resistances are connected to electrodes on both sides of the supporting dielectric member.

It is a further object of this invention to provide a unit of this type which utilizes a base plate with silvered areas the design and physical structure of which is the same for units having varying circuits.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Figures 1, 2, 3, 4, 5, 6, 7, 8:
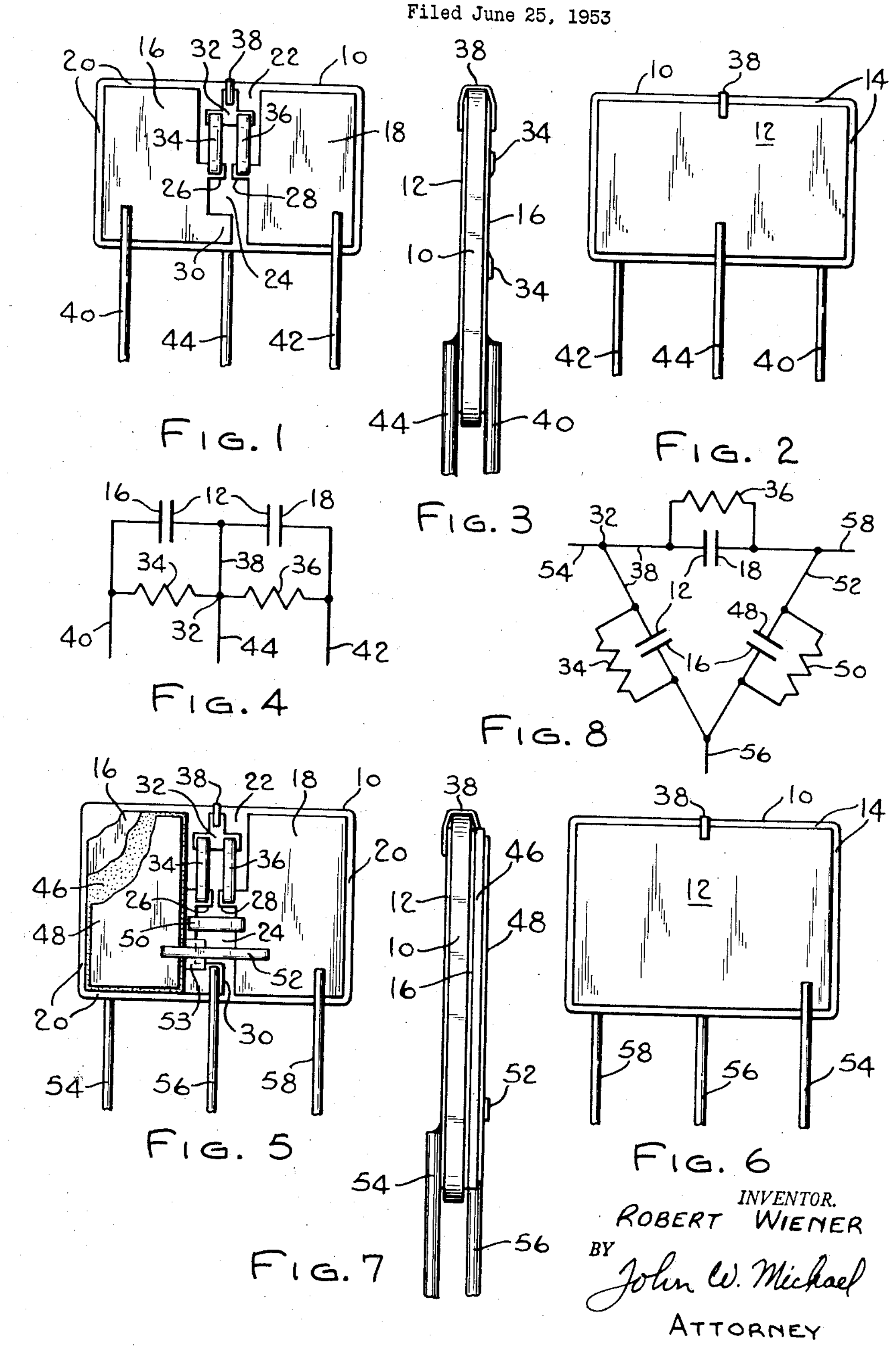
Fig. 1 is a view in front elevation of a printed electronic circuit unit embodying the present invention.
Fig. 2 is a view in rear elevation of the unit shown in Fig. 1.
Fig. 3 is a view in end elevation of the unit of Fig. 1.
Fig. 4 is a schematic diagram of the electronic circuit embodied in the unit of Figs. 1 to 3 inclusive.
Fig. 5 is a view in front elevation of a modified form of a printed electronic circuit unit embodying the present invention.
Fig. 6 is a view in rear elevation of the unit of Fig. 5.
Fig. 7 is a view in end elevation of the unit of Fig. 5.
Fig. 8 is a schematic diagram of the electronic circuit embodied in the unit of Figs. 5 to 7 inclusive.

In both modifications of the unit shown in the drawing the base plate with its silvered areas is identical and only one description will be made. Insofar as the other elements are the same in both modifications they will be given the same reference numerals. The base plate 10 is formed from a flat, rigid body of ceramic material having a relatively high dielectric constant. It provides the support for the unit and the dielectric for the capacitors thereon. The base plate capacitors have a common electrode 12 formed by a silvered area covering one side of said plate except for a relatively small border 14 between its edges and the edges of such base plate. The other electrodes 16 and 18 of the base plate capacitors are formed by two spaced silvered areas. The outer edges of these areas are spaced from the edges of the plate 10 to leave a small border 20. The inner or facing edges of these areas are cut back as shown to provide uncovered portions 22 and 24 on the base plate 10. Between these portions the electrode 16 has a tab 26 and the electrode 18 a tab 28 used for attaching the resistors. Another tab 30 on the electrode 16 is used with the delta type network. In the portion 22 there is a small silvered area 32 forming a connector for resistors 34 and 36 painted on the exposed portion 22 and extending respectively to the tabs 26 and 28. A flat ribbon conductor 38 is soldered to the area 32. It extends around the edge of the plate 10 and is secured to the electrode 12. This much of the structure is identical in each of the networks.

The R. C. network of the unit shown in Figs. 1 to 4 inclusive has two sets of capacitance and resistance in parallel and may be hooked up in desired circuit by three wire leads. Wire leads 40 and 42 are attached respectively to the electrodes 16 and 18 and wire lead 44 is attached to the common electrode 12. The resistances and capacitances of this unit are connected in circuit as shown in the schematic diagram of Fig. 4.

The R. C. delta type network shown in Figs. 5 to 8 inclusive has three sets of capacitance and resistance. It is made structurally by adding to the electrode 16 a third unitary capacitor. This capacitor has a ceramic dielectric plate 46 of electrical characteristics like those of the base plate 10 and proportioned as to area and thickness to produce the same capacitance. This base plate has an outer silvered area forming an electrode 48 and an inner silvered area (not separately shown ). The additional capacitor is mounted to the electrode 16 by sweating or soldering its inner electrode to the electrode 16 in a manner well known in this art. A third resistor 50 is painted on the exposed portion 24 and extends from the electrode 16 to the electrode 18. There is sufficient area on electrode 16 left uncovered by the third capacitor to provide proper connection for such resistor. A ribbon connector 52 is attached to the electrodes 48 and 18. Such connector must be spaced from the exposed portion of electrode 16 or insulated therefrom by a protective layer indicated at 53. This unit has three wire leads by which it may be connected on a circuit. Wire lead 54 is attached to the common electrode 12. Wire leads 56 and 58 are attached respectively to the electrodes 16 and 18. The resistances and capacitances are in this manner connected to form the delta-type filter network shown in the schematic diagram of Fig. 8.

While several embodiments of the invention are shown and described, this application is intended to cover such changes or modifications as come within the spirit of the invention or scope of the following claims.

I claim:

1. A printed electronic circuit resistance capacitance unit comprising a flat, rigid body of ceramic material, a first electrode on one side of said body, a pair of spaced electrodes on the other side of said body in capacitance relation with said first electrode, said spaced electrodes having their facing edges cut back to provide an uncovered portion on said body, tabs on said electrodes, resistance elements applied to said other side in said uncovered portion and connected with said tabs, and a connector on said body connected to said resistance elements and said first electrode.

2. A printed electronic circuit resistance capacitance unit comprising a flat, rigid body of ceramic material, a first electrode on one side of said body, a pair of spaced electrodes on the other side of said body in capacitance relation with said first electrode, said spaced electrodes having projecting tabs on their inner edges, a small separate silvered area on said other side between said spaced electrodes, resistance elements carried on said other side and connected with said tabs and said small separate silvered area, and a connector on said body engaged with said small separate silvered area and said first electrode.

3. A printed electronic circuit resistance capacitance unit comprising a flat, rigid body of ceramic material, a first electrode on one side of said body, spaced electrodes on the other side of said body in capacitance relation with said first electrode, said spaced electrodes having projecting tabs on their facing edges, a small separate silvered area on said other side between said spaced electrodes, resistance elements carried on said other side connected with said tabs and said small silvered area, a first connector on said body engaged with said small separate silvered area and said first electrode, another resistance element on said other side connected with said spaced electrodes, a separate ceramic dielectric capacitor having one of its electrodes secured to one of said spaced electrodes to mount said separate capacitor, and a second connector secured to the other electrode of said separate capacitor and the other of said spaced electrodes.

4. A delta type filter unit comprising a ceramic base plate constituting the support for three capacitors, there being a common electrode on one side of said plate for at least two of said capacitors, three resistance elements on the other side of said plate, and a connector extending from one to the other side of said plate to connect two of said resistance elements to said common electrode, the other end of said two resistance elements being connected to the separate electrodes of the two capacitors using said common electrode, the third of said elements being connected to the two electrodes of the third capacitor.

References Cited in the file of this patent

UNITED STATES PATENTS

| | | |
|---|---|---|
| 2,433,384 | McLarn | Dec. 30, 1947 |
| 2,445,719 | Sylvester | July 20, 1948 |
| 2,464,377 | Cohen | Mar. 15, 1949 |
| 2,566,666 | Kohouri | Sept. 4, 1951 |
| 2,648,804 | Steigerwalt | Aug. 11, 1953 |
| 2,673,949 | Kohouri | Mar. 30, 1954 |
| 2,694,185 | Kodama | Nov. 9, 1954 |

FOREIGN PATENTS

| | | |
|---|---|---|
| 650,912 | Great Britain | Mar. 7, 1951 |

OTHER REFERENCES

Wireless World, 1 sheet, June 1949.